(12) United States Patent  
Giri et al.

(10) Patent No.: US 6,876,479 B1  
(45) Date of Patent: Apr. 5, 2005

(54) TRISTATE ELECTROCHROMIC DEVICE

(75) Inventors: Punam Giri, Holland, MI (US); Thomas F. Guarr, Holland, MI (US)

(73) Assignee: Gentex Corporation, Zeeland, MI (US)

( * ) Notice: Subject to any disclaimer, the term of this patent is extended or adjusted under 35 U.S.C. 154(b) by 0 days.

(21) Appl. No.: 10/850,989

(22) Filed: May 21, 2004

(51) Int. Cl.$^7$ .............................. G02F 1/15; G02F 1/153
(52) U.S. Cl. ........................ 359/273; 359/265; 359/274; 359/275
(58) Field of Search ................................. 359/265–275; 345/107; 252/583, 600; 544/347; 546/257

(56) References Cited

U.S. PATENT DOCUMENTS

| | | | |
|---|---|---|---|
| 5,115,346 A | 5/1992 | Lynam | 359/604 |
| 5,239,406 A | 8/1993 | Lynam | 359/275 |
| 5,355,245 A | 10/1994 | Lynam | 359/267 |
| 5,523,877 A | 6/1996 | Lynam | 359/275 |
| 5,998,617 A | 12/1999 | Srinivasa et al. | 544/347 |
| 6,020,987 A | 2/2000 | Baumann et al. | 359/265 |
| 6,037,471 A | 3/2000 | Srinivasa et al. | 546/257 |
| 6,137,620 A | 10/2000 | Guarr et al. | 359/273 |
| 6,141,137 A | 10/2000 | Byker et al. | 359/265 |
| 6,188,505 B1 | 2/2001 | Lomprey et al. | 359/265 |
| 6,193,912 B1 | 2/2001 | Thieste et al. | 252/583 |
| 6,249,369 B1 | 6/2001 | Theiste et al. | 359/265 |
| 6,288,825 B1 | 9/2001 | Byker et al. | 359/265 |
| 6,310,714 B1 | 10/2001 | Lomprey et al. | 359/265 |
| 6,392,783 B1 | 5/2002 | Lomprey et al. | 359/265 |
| 6,433,914 B1 | 8/2002 | Lomprey et al. | 359/265 |
| 6,445,486 B1 | 9/2002 | Lomprey et al. | 359/265 |
| 6,486,998 B2 | 11/2002 | Lomprey et al. | 359/265 |
| 6,560,004 B2 | 5/2003 | Theiste et al. | 359/265 |
| 6,594,066 B2 | 7/2003 | Lomprey et al. | 359/265 |
| 6,614,578 B2 | 9/2003 | Giri et al. | 359/265 |
| 6,661,559 B2 | 12/2003 | Byker et al. | 359/265 |
| 6,697,185 B2 | 2/2004 | Lomprey et al. | 359/265 |
| 6,700,693 B2 | 3/2004 | Roberts et al. | 359/265 |
| 6,710,906 B2 | 3/2004 | Guarr et al. | 359/265 |
| 6,735,011 B2 | 5/2004 | Lomprey et al. | 359/265 |

*Primary Examiner*—Georgia Epps  
*Assistant Examiner*—Jack Dinh  
(74) *Attorney, Agent, or Firm*—King & Jovanovic, PLC

(57) ABSTRACT

An electrochromic medium for use in a tristate electrochromic device, comprising: (a) at least one solvent; (b) at least one anodic material; (c) at least one cathodic material, wherein both of the anodic and cathodic materials are electroactive and at least one of the anodic and cathodic materials is electrochromic; (d) wherein, in a first state, the electrochromic medium exhibits a maximum light transmission; (e) wherein, in a second state, variable attenuation occurs to a significant extent in one of visible radiation or near-infrared radiation without significant attenuation in the other; and (f) wherein, in a third state, variable attenuation occurs to a significant extent in the other spectral region.

26 Claims, 2 Drawing Sheets

TRISTATE ELECTROCHROMIC DEVICE

CROSS-REFERENCE TO RELATED APPLICATIONS

Not applicable

BACKGROUND OF THE INVENTION

1. Field of the Invention

The present invention relates in general to electrochromic devices and, more particularly, to a tristate electrochromic device having anodic and/or cathodic materials which, upon application of different applied potentials, can selectively absorb predetermined wavelengths of electromagnetic radiation, including visible radiation (i.e. visible light ranging in wavelength from approximately 400 nanometers (nm) to approximately 750 nm) and/or near-infrared radiation (i.e. heat ranging in wavelength from approximately 750 nm to approximately 2,400 nm) and vice versa—depending upon the device configuration.

2. Background Art

Electrochromic devices have been known in the art for several years. Furthermore, the utilization of a plurality of anodic and/or cathodic materials in the medium of an electrochromic device is well known. See, for example, U.S. Pat. No. 5,998,617 entitled "Electrochromic Compounds," U.S. Pat. No. 6,020,987 entitled "Electrochromic Medium Capable Of Producing A Pre-selected Color," U.S. Pat. No. 6,037,471 entitled "Electrochromic Compounds," U.S. Pat. No. 6,141,137 entitled "Electrochromic Media For Producing A Pre-selected Color," U.S. Pat. No. 6,193,912 entitled "Near Infrared-Absorbing Electrochromic Compounds And Devices Comprising Same," and U.S. application Ser. No. 10/283,506 entitled "Electrochromic Device Having An Electron Shuttle," all of which are hereby incorporated herein by reference in their entirety.

While the above-identified references disclose utilizing a plurality of anodic and/or cathodic materials in the medium of an electrochromic device, to the best of Applicant's knowledge, they do not enable a user to selectively absorb light in the visible or near-infrared region simply by varying the applied potential. The inability to operate in this manner has caused prior art devices to be limited in a number of applications.

For example, during hot summer days when the sun is well above the horizon, it may be desirable for an electrochromic device to substantially absorb near-infrared radiation (i.e. heat) without substantially absorbing visible radiation so that an environment (i.e. room, building, etcetera) remains both temperate as well as sufficiently illuminated. However, as the sun approaches the horizon during, for example, periods generally after sunrise and/or before sunset, it may be desirable for an electrochromic device to substantially absorb both near-infrared radiation (i.e. heat) as well as visible radiation (i.e. light), to, in turn, reduce glare and/or undesirable illumination effects associated with the same.

During winter days in cold climates it may be desirable to have a device absorb only visible light during the coldest morning hours when the sun is low on the horizon and to allow the near-infrared light to enter and allow some solar warming of the interior of the building, while at the same time reducing unwanted glare. When the sun is higher in the sky, the device could be turned off to allow both visible light and near-infrared radiation to enter the building, thereby reducing the need for artificial illumination and allowing for solar heat to enter the building. Later in the afternoon, it may be desirable to block both the visible and near-infrared radiation for thermal and visual comfort.

It has now been surprisingly discovered that selective utilization of one or more anodic and/or cathodic electroactive materials enables an electrochromic medium, and, in turn, an electrochromic device, to operate between at least three regions or states (referred to as a tristate device), namely (1) a first state (i.e. when a potential difference less than that sufficient to cause electrochemical oxidation or reduction of the anodic and cathodic materials is applied, a.k.a. the open circuit state or high transmission state) wherein the device has its maximum light transmission; (2) a second state (i.e. an applied potential between the minimum potential where oxidation or reduction of the anodic and cathodic materials occurs up to a "second" potential difference) wherein variable attenuation of either visible radiation or near-infrared radiation occurs to a significant extent depending on the device configuration without significant attenuation in the other spectral region; and (3) a third state (i.e. an applied potential between the "second" potential and a "third" potential difference) wherein variable attenuation occurs to a significant extent in the other spectral region depending on device configuration. It will be understood that attenuation refers to the relative change in transmission of a device as the potential is changed.

It is therefore an object of the present invention to provide a tristate electrochromic device that remedies the aforementioned limitations associated with conventional electrochromic devices.

SUMMARY OF THE INVENTION

The present invention is directed to an electrochromic medium for use in a tristate electrochromic device, comprising: (a) at least one solvent; (b) at least one anodic material; (c) at least one cathodic material, wherein both of the anodic and cathodic materials are electroactive and at least one of the anodic and cathodic materials is electrochromic; (d) wherein the medium has its maximum light transmission in a first state; (e) wherein the medium variably attenuates either visible radiation or near-infrared radiation to a significant extent without significant attenuation in the other spectral region in a second state; and (f) wherein the medium variably attenuates radiation in the other spectral region in a third state.

The present invention is also directed to a tristate electrochromic device, comprising: (a) a first substantially transparent substrate having an electrically conductive material associated therewith; (b) a second substrate having an electrically conductive material associated therewith; (c) an electrochromic medium contained within a chamber positioned between the first and second substrates which comprises: (1) at least one solvent; (2) at least one anodic material; (3) at least one cathodic material, wherein both of the anodic and cathodic materials are electroactive and at least one of the anodic and cathodic materials is electrochromic; (d) wherein the tristate device has its maximum light transmission in a first state; (e) wherein the tristate device variably attenuates either visible radiation or near-infrared radiation to a significant extent without significant attenuation in the other spectral region in a second state; and (f) wherein the tristate device variably attenuates radiation in the other spectral region in a third state.

The present invention is further directed to an electrochromic device capable of operating between a first state, a second state, and a third state, comprising: (a) a first substantially transparent substrate having an electrically conductive material associated therewith; (b) a second substrate having an electrically conductive material associated therewith; (c) an electrochromic medium contained within a chamber positioned between the first and second substrates which comprises: (1) at least one solvent; (2) a first anodic material; (3) a first cathodic material; (4) a second cathodic material, wherein both of the anodic and cathodic materials are electroactive and at least one of the anodic and cathodic materials is electrochromic; (d) wherein the anodic material is present "in excess" such that the current is limited by the first cathodic material when the device reaches the high potential range of the second state and while operating in the second state only the first cathodic material is reduced to a significant extent; and (e) while operating in the third state, the second cathodic material is reduced and when the high potential range of the third state is reached, the current can be limited by either the anodic material or the combination of cathodic materials (or balanced). The choice to limit current at the anode or the cathode can be made according to the teachings of U.S. Pat. No. 6,137,620, entitled "Electrochromic Media With Concentration Enhanced Stability, Process For The Preparation Thereof and Use In Electrochromic Devices" which contains a detailed description of limiting current in an electrochromic device by selection of concentrations of the anodic and cathodic materials, and which is hereby incorporated herein by reference in its entirety.

In accordance with the present invention, an electrochromic device is provided which is capable of operating between a first state, a second state, and a third state, comprising: (a) a first substantially transparent substrate having an electrically conductive material associated therewith; (b) a second substrate having an electrically conductive material associated therewith; (c) an electrochromic medium contained within a chamber positioned between the first and second substrates which comprises: (1) at least one solvent; (2) a first cathodic material; (3) a first anodic material; (4) a second anodic material, wherein both of the anodic and cathodic materials are electroactive and at least one of the anodic and cathodic materials is electrochromic; (d) wherein the cathodic material is present "in excess" such that the current is limited by the first anodic material when the device reaches the high potential range of the second state and while operating in the second state only the first anodic material is oxidized to a significant extent; and (e) while operating in the third state, the second anodic material is oxidized and when the high potential range of the third state is reached, the current can be limited by either the cathodic materials or the combination of anodic material. It will be understood that the terms first and second anodic and cathodic material may include a single compound with multiple oxidation states that have sufficient stability in each of the oxidation states obtained during operation of the device for use in the same. It will be further understood that the second anodic or cathodic material could be prevented from being oxidized, in the case of an anodic material, or reduced, in the case of a cathodic material, by selecting materials with electrochemical redox potentials that differ by a useful amount (typically more than 50 mV or more preferably by more than 100 mV) or by selecting materials displaying different electrode kinetics.

These and other objectives of the present invention will become apparent in light of the present specification, claims, and drawings.

BRIEF DESCRIPTION OF THE DRAWINGS

The invention will now be described with reference to the drawings wherein.

DETAILED DESCRIPTION OF THE INVENTION

Figure 1:
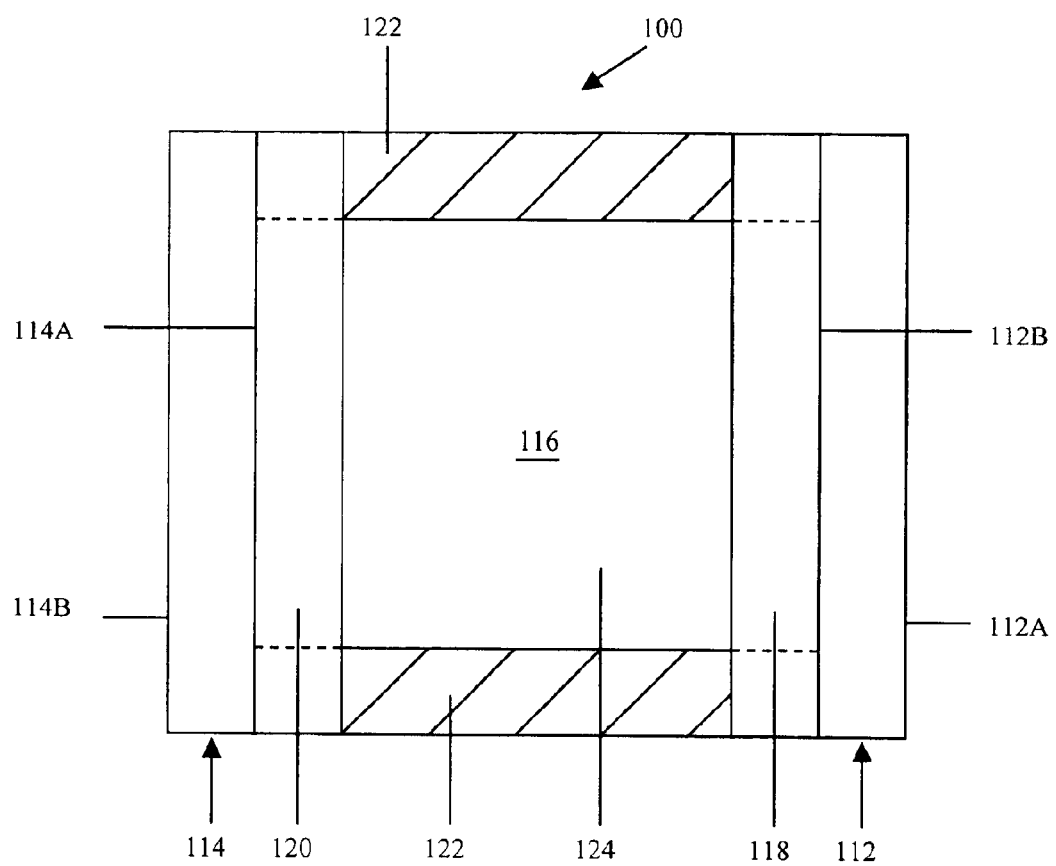
FIG. 1 of the drawings is a cross-sectional schematic representation of an electrochromic device fabricated in accordance with the present invention.

Referring now to the drawings and to FIG. 1 in particular, a cross-sectional schematic representation of tristate electrochromic device 100 is shown, which generally comprises first substrate 112 having front surface 112A and rear surface 112B, second substrate 114 having front surface 114A and rear surface 114B, and chamber 116 for containing electrochromic medium 124. It will be understood that tristate electrochromic device 100 may comprise, for illustrative purposes only, a window, a mirror, a display device, and the like. It will be further understood that FIG. 1 is merely a schematic representation of tristate electrochromic device 100. As such, some of the components have been distorted from their actual scale for pictorial clarity. Indeed, numerous other electrochromic device configurations are contemplated for use, including those disclosed in U.S. Pat. No. 5,818,625 entitled "Electrochromic Rearview Mirror Incorporating A Third Surface Metal Reflector," and U.S. Pat. No. 6,597,489 entitled "Electrode Design For Electrochromic Devices," both of which are hereby incorporated herein by reference in their entirety.

First substrate 112 may be fabricated from any one of a number of materials that are transparent or substantially transparent in the visible region of the electromagnetic spectrum, such as, for example, borosilicate glass, soda lime glass, float glass, natural and synthetic polymeric resins, plastics, and/or composites including Topas®, which is commercially available from Ticona of Summit, N.J. First substrate 112 is preferably fabricated from a sheet of glass having a thickness ranging from approximately 0.5 millimeters (mm) to approximately 12.7 mm. Of course, the thickness of the substrate will depend largely upon the particular application of the electrochromic device. While particular substrate materials have been disclosed, for illustrative purposes only, it will be understood that numerous other substrate materials are likewise contemplated for use—so long as the materials are at least substantially transparent and exhibit appropriate physical properties, such as strength, to be able to operate effectively in conditions of intended use. Indeed, electrochromic devices in accordance with the present invention can be, during normal operation, exposed to extreme temperature variation as well as substantial UV radiation, emanating primarily from the sun.

Second substrate 114 may be fabricated from similar materials as that of first substrate 112. However, if the electrochromic device is a mirror or comprises a mirrored surface, then the requisite of substantial transparency is not necessary. As such, second substrate 114 may, alternatively, comprise polymers, metals, glass, and ceramics to name a few. Second substrate 114 is preferably fabricated from a sheet of glass having a thickness ranging from approximately 0.5 mm to approximately 12.7 mm. If first and second substrates 112 and 114, respectively, are fabricated from sheets of glass, then the glass can optionally be tempered, heat strengthened, and/or chemically strengthened, prior to or subsequent to being coated with layers of electrically conductive material (118 and 120).

One or more layers of electrically conductive material 118 are associated with rear surface 112B of first substrate 112.

These layers serve as an electrode for the electrochromic device. Electrically conductive material 118 is desirably a material that: (a) is substantially transparent in the visible region of the electromagnetic spectrum; (b) bonds reasonably well to first substrate 112; (c) maintains this bond when associated with a sealing member; (d) is generally resistant to corrosion from materials contained within the electrochromic device or the atmosphere; and (e) exhibits minimal diffuse or specular reflectance as well as sufficient electrical conductance. It is contemplated that electrically conductive material 118 may be fabricated from fluorine doped tin oxide (FTO), for example TEC glass, which is commercially available from Libbey Owens-Ford-Co., of Toledo, Ohio, indium/tin oxide (ITO), doped zinc oxide or other materials known to those having ordinary skill in the art.

Electrically conductive material 120 is preferably associated with front surface 114A of second substrate 114, and is operatively bonded to electrically conductive material 118 by sealing member 122. As can be seen in FIG. 1, once bonded, sealing member 122 and the juxtaposed portions of electrically conductive materials 118 and 120 serve to define an inner peripheral geometry of chamber 116. Alternatively, edge sealing techniques may be utilized which are disclosed in U.S. Patent Application Ser. No. 60/548,472 entitled "Vehicular Rearview Mirror Elements and Assemblies Incorporating These Elements," filed on Feb. 27, 2004, which is hereby incorporated herein by reference in its entirety.

Electrically conductive material 120 may vary depending upon the intended use of the electrochromic device. For example, if the electrochromic device is a mirror, then the material may comprise a transparent conductive coating similar to electrically conductive material 118 (in which case a reflector is associated with rear surface 114B of second substrate 114). Alternatively, electrically conductive material 120 may comprise a layer of reflective material in accordance with the teachings of previously referenced and incorporated U.S. Pat. No. 5,818,625. In this case, electrically conductive material 120 is associated with front surface 114A of second substrate 114. Typical coatings for this type of reflector include chromium, rhodium, ruthenium, silver, silver alloys, and combinations thereof.

Sealing member 122 may comprise any material that is capable of being adhesively bonded to the electrically conductive materials 118 and 120 to, in turn, seal chamber 116 so that electrochromic medium 124 does not inadvertently leak out of the chamber. As is shown in dashed lines in FIG. 1, it is also contemplated that the sealing member extend all the way to rear surface 112B and front surface 114A of their respective substrates. In such an embodiment, the layers of electrically conductive material 118 and 120 may be partially removed where the sealing member 122 is positioned. If electrically conductive materials 118 and 120 are not associated with their respective substrates, then sealing member 122 preferably bonds well to glass. It will be understood that sealing member 122 can be fabricated from any one of a number of materials including, for example, those disclosed in: U.S. Pat. No. 4,297,401 entitled "Liquid Crystal Display And Photopolymerizable Sealant Therefor," U.S. Pat. No. 4,418,102 entitled "Liquid Crystal Displays Having Improved Hermetic Seal," U.S. Pat. No. 4,695,490 entitled "Seal For Liquid Crystal Display," U.S. Pat. No. 5,596,023 entitled "Sealing Material For Liquid Crystal Display Panel, And Liquid Crystal Display Panel Using It," U.S. Pat. No. 5,596,024 entitled "Sealing Composition For Liquid Crystal," and U.S. Pat. No. 6,157,480 entitled "Seal For Electrochromic Devices," all of which are hereby incorporated herein by reference in their entirety.

For purposes of the present disclosure, and as will be explained in greater detail herein below, electrochromic medium 124 comprises at least one solvent, at least one anodic material, and at least one cathodic material, wherein the one or more anodic and cathodic materials are selectively chosen so that electrochromic device 100 is capable of operating among a first state, a second state, and a third state.

Electrochromic medium 124 is preferably chosen from one of the following categories:

(1) Single-layer, single-phase—The electrochromic medium may comprise a single-layer of material which may include small non-homogenous regions and includes solution-phase devices where a material may be contained in solution in the ionically conducting electrolyte which remains in solution in the electrolyte when electrochemically oxidized or reduced. Solution phase electroactive materials may be contained in the continuous solution-phase of a gel medium in accordance with the teachings of U.S. Pat. No. 5,928,572 entitled "Electrochromic Layer And Devices Comprising Same," and International Patent Application Serial No. PCT/US98/05570 entitled "Electrochromic Polymeric Solid Films, Manufacturing Electrochromic Devices Using Such Solid Films, And Processes For Making Such Solid Films And Devices," both of which are hereby incorporated herein by reference in their entirety.

More than one anodic and cathodic material can be combined to give a pre-selected color as described in: U.S. Pat. No. 5,998,617 entitled "Electrochromic Compounds," U.S. Pat. No. 6,020,987 entitled "Electrochromic Medium Capable Of Producing A Pre-selected Color," U.S. Pat. No. 6,037,471 entitled "Electrochromic Compounds," and U.S. Pat. No. 6,141,137 entitled "Electrochromic Media For Producing A Pre-selected Color," all of which were previously incorporated herein by reference in their entirety.

The anodic and cathodic materials may also be combined or linked by a bridging unit as described in U.S. Pat. No. 6,241,916 entitled "Electrochromic System" and/or U.S. Patent Publication No. 2002/00152214 A1 entitled "Electrochromic Device," which are hereby incorporated herein by reference in their entirety. The electrochromic materials may also include near-infrared (NIR) absorbing compounds as described in U.S. Pat. No. 6,193,912 entitled "Near Infrared-Absorbing Electrochromic Compounds And Devices Comprising Same," which was previously incorporated herein by reference in its entirety.

It is also possible to link anodic materials or cathodic materials by similar methods. The concepts described in these patents can further be combined to yield a variety of electroactive materials that are linked or coupled, including linking of a redox buffer such as linking of a color-stabilizing moiety to an anodic and/or cathodic material.

The anodic and cathodic electrochromic materials can also include coupled materials as described in U.S. Pat. No. 6,249,369 entitled "Coupled Electrochromic Compounds With Photostable Dication Oxidation States," which is hereby incorporated herein by reference in its entirety.

The concentration of the electrochromic materials can be selected as taught in U.S. Pat. No. 6,137,620 entitled "Electrochromic Media With Concentration Enhanced Stability, Process For The Preparation Thereof and Use In Electrochromic Devices," the entirety of which has been previously incorporated herein by reference.

Additionally, a single-layer, single-phase medium may include a medium where the anodic and cathodic materials are incorporated into a polymer matrix as is described in International Application Serial No. PCT/WO99/02621 entitled "Electrochromic Polymer System," which is hereby incorporated herein by reference in its entirety, and International Patent Application Serial No. PCT/US98/05570 entitled "Electrochromic Polymeric Solid Films, Manufacturing Electrochromic Devices Using Such Solid Films, And Processes For Making Such Solid Films And Devices."

(2) Multi-layer—The medium may be made up in layers and includes a material attached directly to an electrically conducting electrode or confined in close proximity thereto which remains attached or confined when electrochemically oxidized or reduced.

(3) Multi-phase—One or more materials in the medium undergoes a change in phase during the operation of the device, for example a material contained in solution in the ionically conducting electrolyte forms a layer on the electrically conducting electrode when electrochemically oxidized or reduced.

In addition, electrochromic medium 124 may comprise other materials, such as light absorbers, light stabilizers, thermal stabilizers, antioxidants, thickeners, viscosity modifiers, tint providing agents, redox buffers, and mixtures thereof. Suitable UV-stabilizers may include: the material 2-ethyl-2-cyano-3,3-diphenyl acrylate, sold by BASF of Parsippany, N.Y., under the trademark Uvinul N-35 and by Aceto Corp., of Flushing, N.Y., under the trademark Viosorb 910; the material (2-ethylhexyl)-2-cyano-3,3-diphenyl acrylate, sold by BASF under the trademark Uvinul N-539; the material 2-(2'-hydroxy-4'-methylphenyl)benzotriazole, sold by Ciba-Geigy Corp. under the trademark Tinuvin P; the material 3-[3-(2H-benzotriazole-2-yl)-5-(1,1-dimethylethyl)-4-hydroxyphenyl]propionic acid pentyl ester prepared from Tinuvin 213, sold by Ciba-Geigy Corp., via conventional hydrolysis followed by conventional esterification (hereinafter "Tinuvin PE"); the material 2,4-dihydroxybenzophenone sold by, among many others, Aldrich Chemical Co.; the material 2-hydroxy-4-methoxybenzophenone sold by American Cyanamid under the trademark Cyasorb UV 9; and the material 2-ethyl-2'-ethoxyalanilide sold by Sandoz Color & Chemicals under the trademark Sanduvor VSU—to name a few.

For purposes of the present invention, anodic materials may include any one of a number of materials including ferrocene, substituted ferrocenes, substituted ferrocenyl salts, substituted phenazines, phenothiazine, substituted phenothiazines including substituted dithiazines, thianthrene, substituted thianthrenes. Examples of anodic materials may include di-tert-butyl-diethylferrocene, 5,10-dimethyl-5,10-dihydrophenazine (DMP), 3,7,10-trimethylphenothiazine, 2,3,7,8-tetramethoxythianthrene, 10-methylphenothiazine, tetramethylphenazine (TMP)—see U.S. Pat. No. 6,242,602 B1 for synthesis, which is hereby incorporated herein by reference in its entirety, and bis(butyltriethylammonium)-para-methoxytriphenodithiazine (TPDT)—see synthesis of 3,10-dimethoxy-7,14-(triethylammoniumbutyl)triphenodithiazine bis (tetrafluoroborate) in U.S. Pat. No. 6,710,906 B2, which is hereby incorporated herein by reference in its entirety. It is also contemplated that the anodic material may comprise a polymer film, such as polyaniline, polythiophenes, polymeric metallocenes, or a solid transition metal oxide, including, but not limited to, oxides of vanadium, nickel, iridium, as well as numerous heterocyclic compounds, etcetera. It will be understood that numerous other anodic materials are contemplated for use including those disclosed in U.S. Pat. No. 4,902,108 entitled "Single-Compartment, Self-Erasing, Solution-Phase Electrochromic Devices, Solutions For Use Therein, And Uses Thereof," as well as U.S. Pat. No. 6,188,505 B1 entitled "Color-Stabilized Electrochromic Devices," and U.S. patent application Ser. No. 10/054,108 entitled "Controlled Diffusion Coefficient Electrochromic Materials For Use In Electrochromic Mediums And Associated Electrochromic Devices," all of which are hereby incorporated herein by reference in their entirety.

Cathodic materials may include, for example, viologens, such as methyl viologen tetrafluoroborate, octyl viologen tetrafluoroborate (octylviologen), or benzyl viologen tetrafluoroborate, ferrocinium salts, such as (6-(tri-tert-butylferrocinium)hexyl)triethylammonium di-tetrafluoroborate ($TTBFc^+$)—see U.S. patent application Ser. No. 10/681,538 entitled "Reversible Electrodeposition Devices And Associated Electrochemical Media" for synthesis which is hereby incorporated herein by reference in its entirety. It will be understood that the preparation and/or commercial availability for each of the above-identified cathodic materials is well known in the art. See, for example, "The Bipyridinium Herbicides" by L. A. Summers (Academic Press 1980). While specific cathodic materials have been provided for illustrative purposes only, numerous other conventional cathodic materials are likewise contemplated for use including, but by no means limited to, those disclosed in previously referenced and incorporated U.S. Pat. No. 4,902,108, U.S. Pat. No. 6,188,505, and U.S. patent application Ser. No. 10/054,108 entitled "Controlled Diffusion Coefficient Electrochromic Materials For Use In Electrochromic Mediums And Associated Electrochromic Devices." Moreover, it is contemplated that the cathodic material may comprise a polymer film, such as various substituted polythiophenes, polymeric viologens, an inorganic film, or a solid transition metal oxide, including, but not limited to, tungsten oxide.

For illustrative purposes only, the concentration of the anodic and cathodic materials can range from approximately 1 millimolar (mM) to approximately 500 mM and more preferably from approximately 2 mM to approximately 100 mM. While particular concentrations of the anodic as well as cathodic materials have been provided, it will be understood that the desired concentration may vary greatly depending upon the geometric configuration of the chamber containing electrochromic medium 124.

For purposes of the present disclosure, a solvent of electrochromic medium 124 may comprise any one of a number of common, commercially available solvents including 3-methylsulfolane, dimethyl sulfoxide, dimethyl form amide, tetraglyme and other polyethers; alcohols such as ethoxyethanol; nitrites, such as acetonitrile, glutaronitrile, 3-hydroxypropionitrile, and 2-methylglutaronitrile; ketones including 2-acetylbutyrolactone, and cyclopentanone; cyclic esters including beta-propiolactone, gamma-butyrolactone, and gamma-valerolactone; propylene carbonate (PC), ethylene carbonate; and homogenous mixtures of the same. While specific solvents have been disclosed as being associated with the electrochromic medium, numerous other solvents that would be known to those having ordinary skill in the art having the present disclosure before them are likewise contemplated for use.

In one embodiment of the present invention, electrochromic medium 124 of tristate electrochromic device 100 comprises: a first anodic material ($A_1$); a first cathodic material ($C_1$); and a second cathodic material ($C_2$), which in a first state (i.e. the open circuit, zero potential, or high transmission state) substantially absorbs neither visible radiation nor near-infrared radiation.

During operation of the device in the second state (the potential range of which is determined by the anodic and cathodic materials selected for use in the device), the anodic material is oxidized from ($A_1$) to ($A_1^+$), and the current is limited by the first cathodic material ($C_1$) being reduced to ($C_1^-$). In this second state one region of the electromagmetic spectrum, either the visible or the near-infrared, is absorbed without substantial change in the absorbance in the other region. If the absorbance takes place in the near-infrared then such a state, as previously discussed, is ideal for maintaining a temperate environment in a building, room and/or office during hot summer days without substantially absorbing visible illumination from the sun.

During operation of the device in the third state (the potential range of which is determined by the anodic and cathodic materials selected for use in the device), the remainder of the first anodic material is oxidized from ($A_1$) to ($A_1^+$), and the current is limited by the second cathodic material being reduced from ($C_2$) to ($C_2^-$). In this third state a substantial portion of both near-infrared and visible radiation is absorbed. Such a state, as previously discussed, is ideal for maintaining a temperate environment and reducing glare and/or undesirable illumination effects associated with periods generally after sunrise and/or before sunset—when the sun approaches the horizon.

In another embodiment of the present invention, electrochromic medium 124 of tristate electrochromic device 100 comprises: a first cathodic material ($C_1$); a first anodic material ($A_1$); and a second anodic material ($A_2$), which in a first state substantially absorbs neither visible radiation nor near-infrared radiation.

During operation of the device in the second state (the potential range of which is determined by the anodic and cathodic materials selected for use in the device), the cathodic material is reduced from ($C_1$) to ($C_1^-$), and the current is limited by the first anodic material ($A_1$) being oxidized to ($A_1^+$). If the absorbance takes place in the visible region then such a state, as previously discussed, is ideal for promoting visual comfort as well as a temperate environment, during, for example, cold winter days.

During operation of the device in the third state (the potential range of which is determined by the anodic and cathodic materials selected for use in the device), the remainder of the cathodic material is reduced from ($C_1$) to ($C_1^-$), and current is limited by the second anodic material being oxidized from ($A_2$) to ($A_2^+$). In this third state a substantial portion of both near-infrared and visible radiation is absorbed. Such a state, as previously discussed, is ideal for maintaining a temperate environment and reducing glare and/or undesirable illumination effects associated with periods generally after sunrise and/or before sunset—when the sun approaches the horizon.

Tristate electrochromic devices can be used in a wide variety of applications wherein the transmitted or reflected light/heat can be modulated. Such devices include mirrors; windows for the exterior of a building, home or vehicle; skylights for buildings including tubular light filters; windows in office or room partitions; and light filters for photographic devices and light sensors.

The electrochromic media of the present invention utilize many different materials, the preparation and/or commercially available sources are provided herein, unless the material is well known in the art. It will be understood that, unless specified otherwise, the starting reagents are commercially available from Aldrich Chemical Co., of Milwaukee, Wis., Ciba-Geigy Corp., and/or other common chemical suppliers. It will be further understood that conventional chemical abbreviations will be used when appropriate including the following: grams (g); milliliters (mL); moles (mol); millimoles (mmol); molar (M); millimolar (mM); pounds per square inch (psi); hours (h); and degrees Centigrade (° C).

In support of the present invention, multiple experiments were conducted wherein tristate devices were prepared and their functionality was validated.

It will be understood that in each of the experiments provided below, the electrochromic medium materials were dissolved in propylene carbonate (PC).

Experiment No. 1

In this experiment the electrochromic medium was prepared by mixing the following materials together in the concentrations provided below:

| Experiment No. 1 | | |
|---|---|---|
| Component | Material | Concentration |
| First Anodic | DMP | 10 mM |
| Second Anodic | TPDT | 30 mM |
| First Cathodic | Octylviologen | 55 mM |
| Tinting Additive | TMP | 4 mM |

The medium of Experiment No. 1 was associated with an electrochromic window for testing. It will be understood that an amount of TMP was added to the electrochromic medium to intentionally produce a lightly tinted or "grey" colored medium. Specifically, the window comprised two 2×5 inch glass substrates. Surface (112B) of the first substrate (112) was coated with generally clear, conductive indium/tin oxide (ITO), and the second substrate (114) was coated with indium/tin oxide (ITO) on surface (114A). The substrates were spaced 137 microns apart for accommodating the medium. The window was filled with the above-identified medium via conventional vacuum backfilling. After fabrication, the absorbance of the device was measured at voltages ranging from between 0.0 V and 1.4 V using conventional spectroscopy. Spectral data relative to Experiment No. 1 is provided herein below.

| Applied Potential (V) | % of Total Solar Radiation Transmitted | % of Solar Radiation Transmitted in the NIR Region | % of Solar Radiation Transmitted in the Visible Region |
|---|---|---|---|
| 0.0 | 61.8 | 49.3 | 72.6 |
| 0.1 | 61.8 | 49.3 | 72.6 |
| 0.2 | 63.2 | 50.5 | 74.3 |
| 0.3 | 62.5 | 50.5 | 72.9 |
| 0.4 | 58.5 | 50.4 | 65.7 |
| 0.5 | 50.7 | 50.0 | 51.6 |
| 0.6 | 40.1 | 48.9 | 32.9 |
| 0.8 | 27.6 | 44.6 | 13.3 |
| 0.9 | 26.5 | 43.7 | 12.0 |
| 1.0 | 23.4 | 39.7 | 9.7 |
| 1.1 | 17.6 | 30.0 | 7.1 |
| 1.2 | 17.6 | 30.0 | 7.1 |
| 1.4 | 14.4 | 24.6 | 5.9 |

Figure 2:
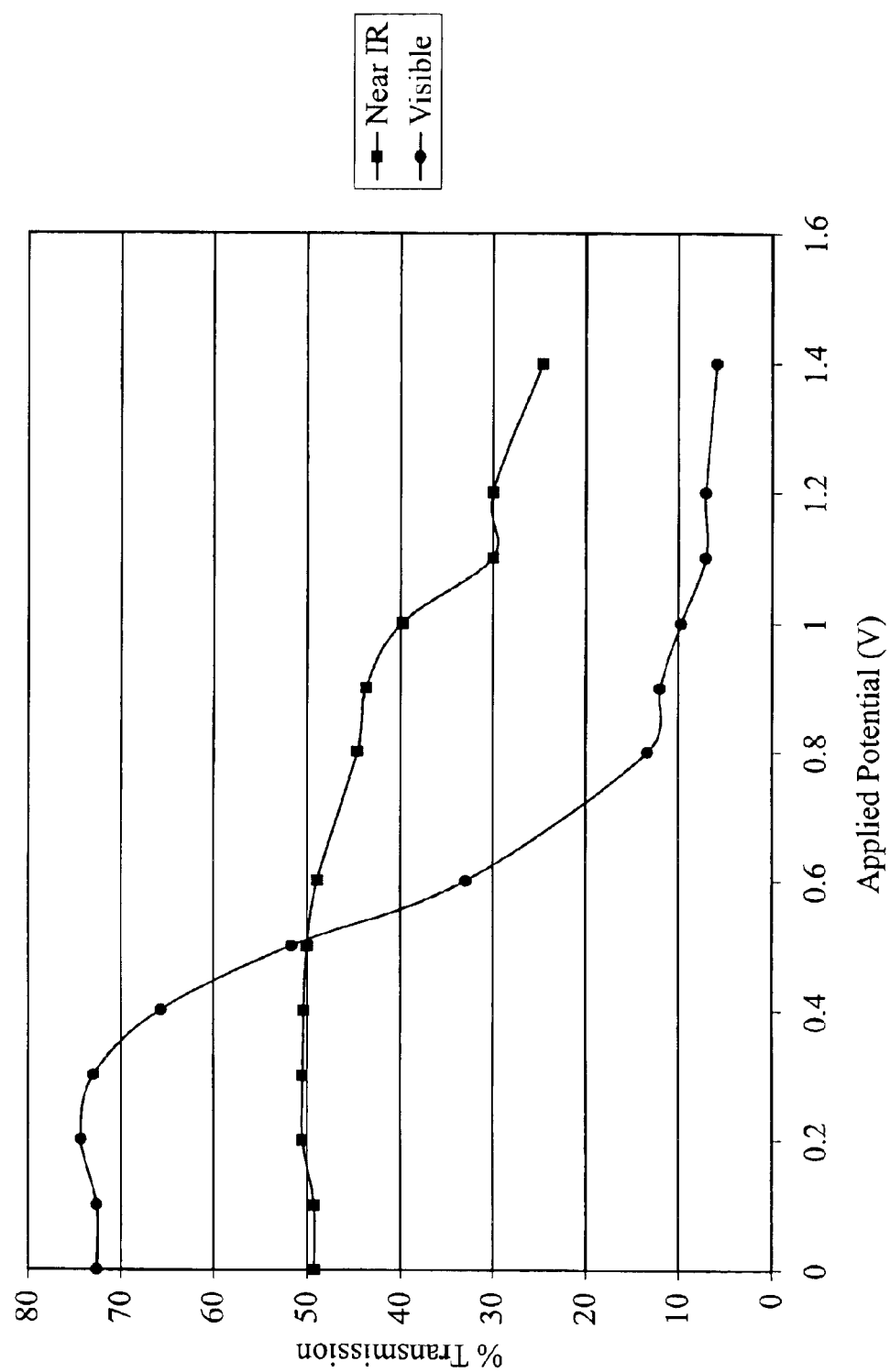
FIG. 2 of the drawings is a two-dimensional plot showing % transmission as a function of applied potential for the medium of Experiment No. 1.

It can been seen numerically in the table above, or graphically in FIG. 2, that through the second state (approximately 0.1 V–approximately 0.9 V for this particular device) the visible radiation transmitted is reduced by a factor of about 6 while the NIR radiation transmitted remains largely unchanged, and that through the third state (approximately 0.9 V–approximately 1.4 V for this particular) the NIR light transmitted is reduced to roughly 50% of the value at the end of the second state and radiation in the visible is reduced by about 50%.

While in the examples anodic near-infrared absorbers have been used, it is also contemplated that cathodic materials with near-infrared absorbance be utilized in devices of the present invention.

Experiment No. 2

In this experiment the electrochromic medium was prepared by mixing the following materials together in the concentrations provided below:

Experiment No. 2

| Component | Material | Concentration |
| --- | --- | --- |
| First Cathodic | TTBFc$^+$ | 12 mM |
| Second Cathodic | Octylviologen | 30 mM |
| First Anodic | TPDT | 60 mM |

The medium of Experiment No. 2 was associated with an electrochromic window for testing. Specifically, the window comprised two 2×5 inch glass substrates. Surface (112B) of the first substrate (112) was coated with generally clear, conductive indium/tin oxide (ITO), and the second substrate (114) was coated with indium/tin oxide (ITO) on surface (114A). The substrates were spaced 137 microns apart for accommodating the medium. The window was filled with the above-identified medium via conventional vacuum backfilling. After fabrication, the absorbance of the device was measured at voltages ranging from between 0.0 V and 1.2 V using conventional spectroscopy. Spectral data relative to Experiment No. 2 is provided herein below.

| Applied Potential (V) | % of Total Solar Radiation Transmitted | % of Solar Radiation Transmitted in the NIR Region | % of Solar Radiation Transmitted in the Visible Region |
| --- | --- | --- | --- |
| 0.0 | 58.2 | 46.1 | 68.7 |
| 0.9 | 33.1 | 20.4 | 44.2 |
| 1.2 | 12.5 | 10.6 | 14.2 |

It can been seen that through the second state the NIR radiation transmitted is reduced by more than 50% while the visible radiation transmitted remains at 66% its original level, and that through the third state the visible light transmitted is reduced to roughly 25% of the value at the end of the second state and radiation in the NIR is reduced by less than 50%.

While the invention has been described in detail herein in accordance with certain preferred embodiments thereof, many modifications and changes therein may be effected by those skilled in the art. Accordingly, it is our intent to be limited only by the scope of the appending claims and not by way of details and instrumentalities describing the embodiments shown herein.

What is claimed is:

1. An electrochromic medium for use in a tristate electrochromic device, comprising:
    at least one solvent;
    at least one anodic material;
    at least one cathodic material, wherein both of the anodic and cathodic materials are electroactive and at least one of the anodic and cathodic materials is electrochromic;
    wherein, in a first state, the electrochromic medium exhibits a maximum light transmission;
    wherein, in a second state, variable attenuation occurs to a significant extent in one of visible radiation or near-infrared radiation without significant attenuation in the other; and
    wherein, in a third state, variable attenuation occurs to a significant extent in the other spectral region.

2. The electrochromic medium according to claim 1, wherein a first cathodic material comprises a ferrocinium species.

3. The electrochromic medium according to claim 1, wherein a second cathodic material comprises a viologen.

4. The electrochromic medium according to claim 1, wherein a first anodic material comprises a dithiazine.

5. The electrochromic medium according to claim 1, wherein a first cathodic material comprises a ferrocinium species, a second cathodic material comprises a viologen, and a first anodic material comprises a dithiazine.

6. The electrochromic medium according to claim 1, wherein a first cathodic material comprises a viologen.

7. The electrochromic medium according to claim 1, wherein a first anodic material comprises a substituted phenazine.

8. The electrochromic medium according to claim 1, wherein a second anodic material comprises a dithiazine.

9. The electrochromic medium according to claim 1, wherein a first anodic material comprises a substituted phenazine, a second anodic material comprises a dithiazine, and a first cathodic material comprises a viologen.

10. The electrochromic medium according to claim 1, wherein the concentration of a first cathodic material ranges from approximately 1 mM to approximately 500 mM.

11. The electrochromic medium according to claim 1, wherein the concentration of a first cathodic material ranges from approximately 2 mM to approximately 100 mM.

12. The electrochromic medium according to claim 1, wherein the concentration of a second cathodic material ranges from approximately 1 mM to approximately 500 mM.

13. The electrochromic medium according to claim 1, wherein the concentration of a second cathodic material ranges from approximately 2 mM to approximately 100 mM.

14. The electrochromic medium according to claim 1, wherein the concentration of a first anodic material ranges from approximately 1 mM to approximately 500 mM.

15. The electrochromic medium according to claim 1, wherein the concentration of a first anodic material ranges from approximately 2 mM to approximately 100 mM.

16. The electrochromic medium according to claim 1, wherein the concentration of a second anodic material ranges from approximately 1 mM to approximately 500 mM.

17. The electrochromic medium according to claim 1, wherein the concentration of a second anodic material ranges from approximately 2 mM to approximately 100 mM.

18. The electrochromic medium according to claim 1, wherein the electrochromic medium further comprises a cross-linked polymer matrix.

19. The electrochromic medium according to claim 1, wherein the electrochromic medium further comprises a free-standing gel.

20. The electrochromic medium according to claim 1, wherein the electrochromic medium further comprises a substantially non-weeping gel.

21. A tristate electrochromic device, comprising:
   a first substantially transparent substrate having an electrically conductive material associated therewith;
   a second substrate having an electrically conductive material associated therewith; and
   the electrochromic medium according to claim 1 contained within a chamber positioned between the first and second substrates.

22. The electrochromic device according to claim 21, wherein the device is an electrochromic window.

23. The electrochromic device according to claim 21, wherein the second substrate is coated with a reflective material.

24. The electrochromic device according to claim 23, wherein the device is an electrochromic mirror.

25. A tristate electrochromic device, comprising:
   at least one substantially transparent substrate having an electrically conductive material associated therewith; and
   an electrochromic medium which comprises:
      at least one solvent;
      at least one anodic material;
      at least one cathodic material, wherein both of the anodic and cathodic materials are electroactive and at least one of the anodic and cathodic materials is electrochromic;
      wherein, in a first state, the electrochromic medium exhibits a maximum light transmission;
      wherein, in a second state, variable attenuation occurs to a significant extent in one of visible radiation or near-infrared radiation without significant attenuation in the other; and
      wherein, in a third state, variable attenuation occurs to a significant extent in the other spectral region.

26. A tristate electrochromic device, comprising:
   a first substantially transparent substrate having an electrically conductive material associated therewith;
   a second substrate having an electrically conductive material associated therewith;
   an electrochromic medium contained within a chamber positioned between the first and second substrates which comprises:
      at least one solvent;
      at least one anodic material;
      at least one cathodic material, wherein both of the anodic and cathodic materials are electroactive and at least one of the anodic and cathodic materials is electrochromic;
   wherein the tristate device substantially absorbs neither near-infrared, nor visible radiation in a first state;
   wherein the tristate device substantially absorbs either near-infrared, or visible radiation in a second state; and
   wherein the tristate device substantially absorbs both near-infrared, and visible radiation in a third state.

* * * * *